May 23, 1967  H. BUNCHER  3,321,222
BRACE CONNECTION FOR SCAFFOLDING STRUCTURES
Filed Dec. 14, 1964  2 Sheets-Sheet 1

INVENTOR
HOWARD BUNCHER
BY Seidel & Gonda
ATTORNEYS.

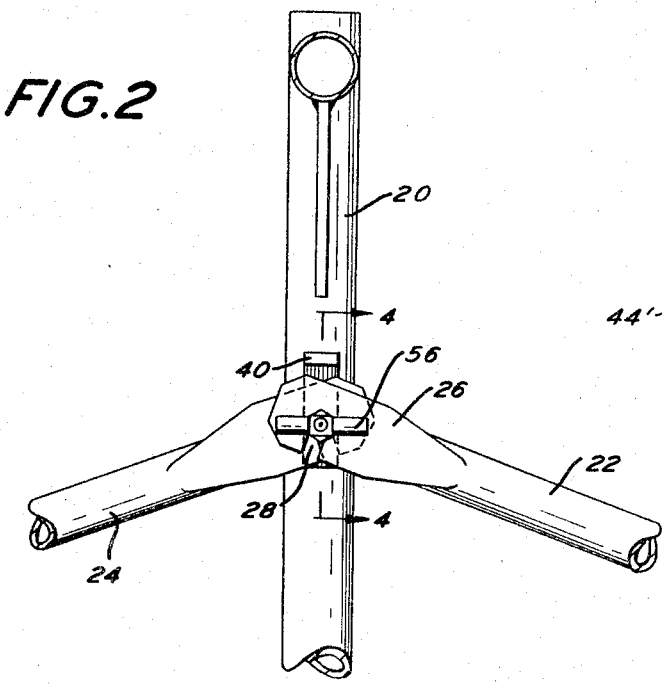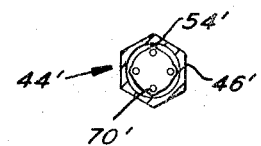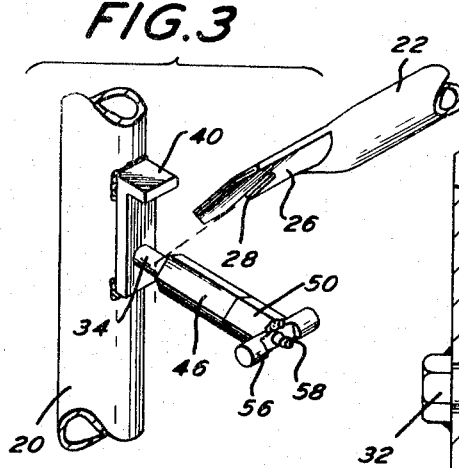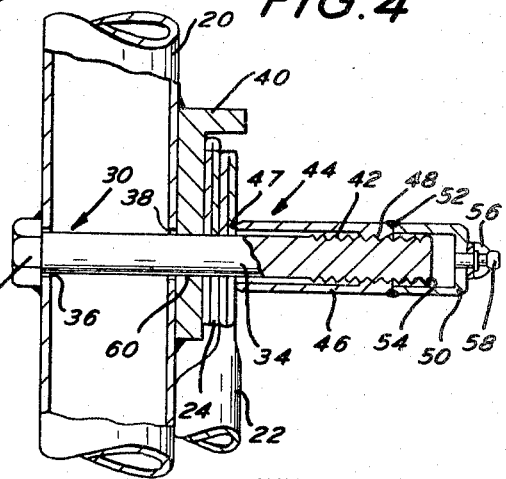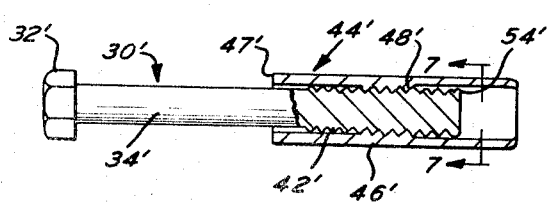

United States Patent Office 3,321,222
Patented May 23, 1967

3,321,222
BRACE CONNECTION FOR SCAFFOLDING STRUCTURES
Howard Buncher, Adamson and Lehigh Drive, Easton, Pa. 18042
Filed Dec. 14, 1964, Ser. No. 417,934
5 Claims. (Cl. 287—53.5)

This invention relates to novel structure used in the construction of scaffolding from a plurality of structural frame members, and in particular to structure for connecting braces between the structural frame members of the scaffolding.

Heretofore, the braces between the main structural frame members in a scaffold have been connected to studs mouned on the structural frame members and locked in place by means of wing nuts threadedly connected to the studs. The braces include flattened end portions having slots. The slots in the ends of the braces are telescoped over a stud shank and a wing nut on the stud tightened to clamp the brace in place.

After assembly and disassembly of the scaffolding over a protracted period of time it was found that the braces would mash the threads upon the studs, thereby rendering them ineffective. The particular structural frame member mounting the stud would no longer be of any use and would have to be discarded. The exposed threads on the stud had the tendency to become corroded due to exposure to the elements, thereby preventing the rotation of the wing nut to a clamping position. Mortar from the work would gum up the threads on the studs. Since the studs were threaded to their free end, the wing nuts disposed upon the studs could become completely disassociated from the studs and lost.

The present invention relates to a structural arrangement for mounting and clamping the braces in a scaffold arrangement to the structural frame members of the scaffold. The structural arrangement includes a bolt having an exposed shank portion for receiving an end of a brace. A nut assembly is provided on the exposed shank in threaded engagement with the shank for clamping the brace to the structural frame member. The threaded shank portion of the bolt is never exposed to the brace, the elements, or the work. The threaded connection is protected at all times, prolonging its life and effective usefulness. The nut assembly is maintained captive upon the exposed shank, thereby precluding its loss.

Accordingly, it is an object of this invention to provide knockdown scaffolding adapted to be quickly assembled and disassembled.

Another object of this invention is to provide knockdown scaffolding including a novel structural arrangement for effecting the connection of the braces of the scaffolding between the main structural members.

Yet another object of this invention is to provide knockdown scaffolding including a novel brace connection which is capable of longer life and more efficient use.

A still further object of this invention is to provide knockdown scaffolding including a brace connection having a clamping element for effecting the connection of the brace to a main structural frame member of the scaffolding, the clamping element including a threaded connection which is protected against exposure at all times.

A still further object of this invention is to provide knockdown scaffolding including a brace connection having a clamping element for effecting the connection of the brace to a main structural frame member of the scaffolding, the clamping element being held captive at all times upon the structural member thereby eliminating its possible disassociation and loss.

Other objects will appear from the disclosure which follows after.

For the purpose of illustrating the invention, there is shown in the drawings a form which is presently preferred; it being understood, however, that this invention is not limited to the precise arrangements and instrumentalities shown.

FIGURE 2 is a cross sectional view taken substantially along the plane indicated by the line 2—2 of FIGURE 1 and illustrating the brace connection in the scaffolding.

FIGURE 3 is a fragmentary perspective view of the brace connection illustrated in FIGURE 2, just prior to mounting the brace or just after removing the brace.

FIGURE 4 is a cross sectional view taken substantially along the plane indicated by the line 4—4 of FIGURE 2.

FIGURE 6 is a cross sectional view of another embodiment of the invention.

FIGURE 7 is a cross sectional view taken along the plane indicated by the line 7—7.

Figure 1:
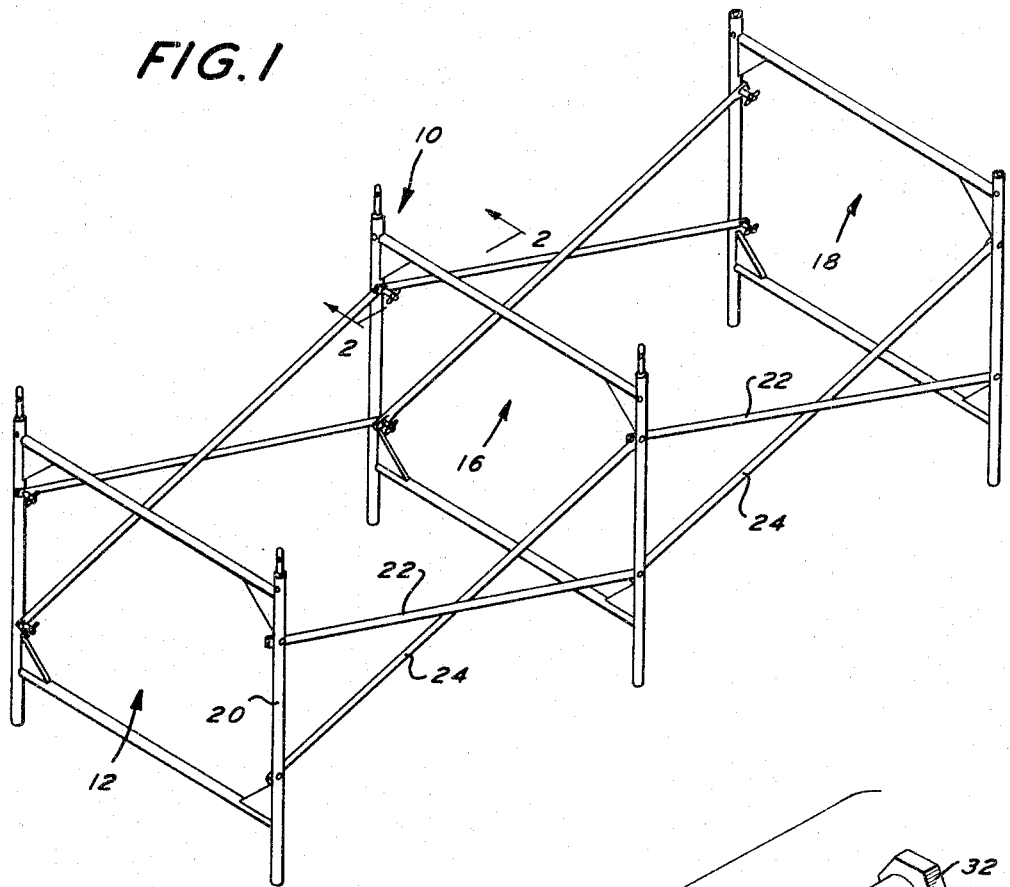
FIGURE 1 is a perspective view of a portion of the knockdown scaffolding comprising the subject matter of the present invention.
Figure 5:
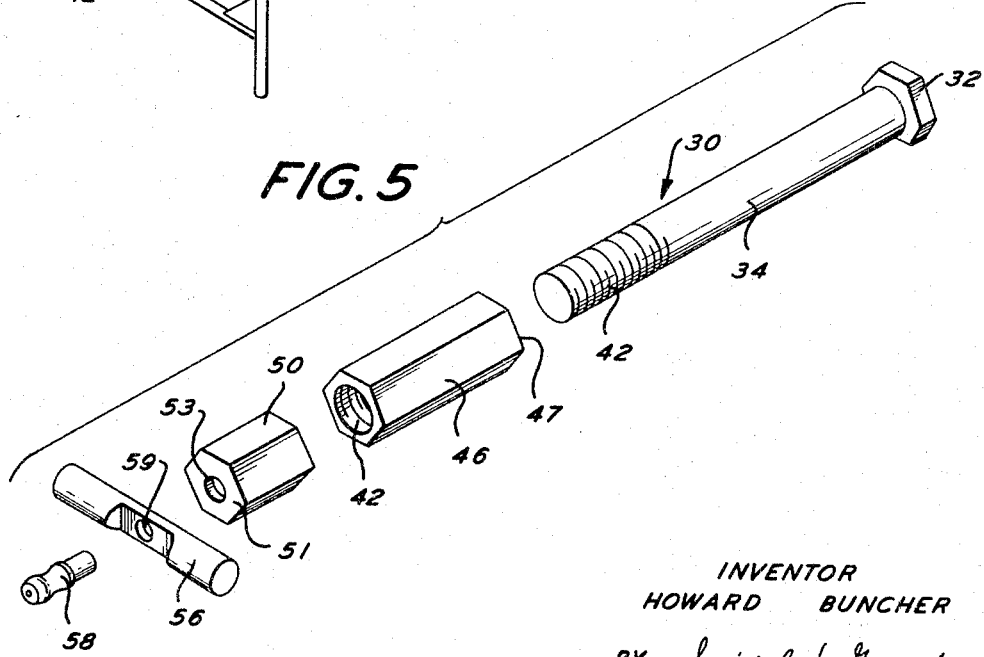
FIGURE 5 is an exploded perspective view of the brace clamping assembly.

Referring now to the drawings in detail, wherein like numerals indicate like elements, the scaffolding of the present invention is generally indicated in FIGURE 1 by the numeral 10. It should be understood that the scaffolding can be of an indeterminate length and thus only an illustrative portion is shown and disclosed.

The scaffolding 10 includes a plurality of main structural frame members 12, 16, and 18. These members are incapable of self-support, but when connected in series, form a very rigid supporting structure.

Each of the frame members 12, 16, and 18 include upright supporting legs 20. Diagonal braces such as 22 and 24 are adapted to connect adjacent legs 20 on each of the structural frame members to form the scaffolding 10.

In order to effect the connection of the braces 22, 24 to the upright legs 20, a bolt 30 is provided and mounted upon each of the upright legs 20. The bolt 30 includes a head 32, a shank 34 extending from the head 32, and a threaded end portion 42. A bolt 30 is placed through a pair of aligned apertures 36 and 38 in each of the upright legs 20. The head of the bolt 32 is welded or otherwise secured to the upright leg. The bolts 30 extend substantially perpendicular to each of the upright legs and are parallel to each other.

As shown most clearly in FIGURES 3 and 4, an unthreaded portion of the shank 34 of each of the bolts 30 is exposed and adapted to receive and mount an end of one of the braces 22 and 24. The braces include flattened ends 26 having a slot 28. The slot 28 is adapted to be telescoped over the exposed shank 34 of the bolt 30 and clamped to the upright leg 20 to effect the requisite connection.

A clamping nut assembly generally designated by numeral 44 is threadedly connected and held captive on the threaded end 42 of each of the bolts. The clamping nut assembly 44 includes a hexagonal nut 46. The nut 46 is internally threaded adjacent one end only as indicated at 48. The nut 46 has its threads 48 threadedly connected to the threads 42 on the end of the shank 34. The end 47 of the nut 46 is adapted to be threaded along the shank 34 until it abuts a flattened end 26 of a brace 22 or 24 to clamp the brace against an upright leg 20.

The end of the shank 34 is peened as indicated at 54 to enlarge its outer diameter. The outer diameter of the peened end 54 of the shank 34 is greater than the outer diameter of the threads 42. Accordingly, the nut 46, once disposed upon the threads 42 of the shank 34, cannot be removed from the shank 34 and is held captive.

The nut 46 is of a sufficient length so that when the threads 48 are adjacent the last thread on the outer end of the shank 34 and the peened head 54, the threaded end 42 of the shank 34 is completely covered by the nut. Hence, the threaded end 42 of the shank is never exposed to the elements, the work, or the flattened end 26 of a brace. This renders the threads 42 long lasting, efficient and ready for use.

In order to effect rotation of the nut 46 upon the end of the shank 34, a hollow cap 50 is provided. The cap 50 has an internal diameter sufficiently large so that it can be passed over the peened end 54 of the shank 34. Cap 50 is adapted to be passed over the peened end 54 and abut the remote end of the nut 46. The cap 50 is then welded as shown at 52 or otherwise secured to the end of the nut 46 which it abuts. The cap 50 has a solid end wall 51. An aperture 53 is provided in the end wall 51. A handle 56 is connected to the end wall 51 of the cap 50 by means of a clamping grease fitting 58. The grease fitting 58 extends through an aperture in the handle 56 and into the aperture 53 in the end wall of 51 of the cap 50.

Rotation of the handle 56 will impart rotation to the nut 46. Because of the grease fitting 58, the threaded connection between the nut assembly 44 and the threaded end 42 of the shank 34 may be lubricated to maintain the nut 46 freely reciprocable along the shank 34.

The apertures 36 and 38 in each upright leg 20 are formed slightly larger then the diameter of the shank 34 to readily enable it to pass through the apertures. In order to prevent wobbling of the shank 34 relative to an upright leg 20, an L-shaped wobble plate 40 is provided. The wobble plate 40 is disposed between a leg 20 and a nut assembly 44 on the shank 34 and welded or otherwise secured to the upright leg. The diameter of the aperture 60 in the wobble plate 40 which surrounds the shank 34 closely approximates the diameter of the shank. Hence, relative movement between the shank 34 and the upright leg 20 is prevented.

Since the nut assembly 44 is maintained captive on the shank, it cannot come off and hence be lost. The nut 46 is sufficient length to cover the threaded end 42 of the shank 34 at all times. Rotation of the nut 46 of the nut assembly 44 is easily effected by rotating handle 56. If lubrication between the threads 42 and 48 is desired, grease may be introduced to the threaded connection through the grease fitting 58 and cap 50.

Referring now to FIGURE 6, there is shown another embodiment of the present invention. To simplify the explanation, similar elements are designated by numerals used in the description of the embodiment illustrated in FIGURES 1 to 5 but are primed.

As illustrated in FIGURE 6, a bolt 30' adapted to be mounted upon the upright leg is provided. The bolt 30' includes a head 32', a shank 34' extending from the head 32', and a threaded end portion 42'.

As shown most clearly in FIGURE 6, an unthreaded portion of the shank 34' of the bolt 30' is exposed and is adapted to receive and mount an end of the braces. A clamping nut generally designated by numeral 44' is threadedly connected and held captive on the threaded end 42' of the bolt 30'. The clamping nut 44' includes a hexagonal nut 46'. The nut 46' is internally threaded intermediate its ends only as indicated at 48'. The nut 46' has its threads 48' threadedly connected to the threads 42' on the end of the shank 34'. The end 47' of the nut 46' is adapted to be threaded along the shank 34' to clamp the braces against an upright leg.

The end of the shank 34' is peened as indicated at 54' to enlarge its outer diameter. The outer diameter of the peened end 54' of the shank 34' is greater then the outer diameter of the threads 42'. Accordingly, the nut 46', once disposed upon the threads 42' of the shank 34', cannot be removed from the shank 34' it being held captive. The nut 46' is of sufficient length so that when the threads 48' are adjacent the peened end 54' of the shank 34', the threaded end 42' of the shank 34' is completely covered by the nut. Hence, the threaded end 42' of the shank is never exposed to the elements, the work, or the flattened ends of a brace. This renders threads 42' long lasting, efficient and ready to use.

The clamping mechanism shown in FIGURE 6 and 7 is made in the following manner. The dimensions set forth are illustrative, and are not to be regarded as in any way limiting.

A piece of 11/16 inch O.D. hex bar stock is cut to a length of 2¾ inch. A ½ inch diameter hole is drilled through the entire length of the bar stock. Next a 9/16 inch hole is drilled from one end of the bar stock for a length of 1 inch. Then a ½ inch length of the hole is internally threaded using a standard ½ inch tap with 13 threads per inch. The balance of the length of the bar stock which is 1¼ inch in length remains with the original half inch hole.

After the nut 46' has been fabricated as described above, it is threaded onto the bolt 30' as shown in FIGURE 6. A four prong punch is inserted through the 9/16 inch diameter hole and struck with a hammer. The result is that the end of the bolt has four indentations 70' as shown in FIGURE 7. This effectively expands the end of the bolt 30' thereby providing the peened end 54'. It is of course obvious that the end will not be peened until such time that the bolt 30' is inserted through the upright supports.

After the clamping mechanism has been assembled as described above, a rotation handle may be attached to the ends thereof.

Alternatively, the end may be left as shown in FIGURE 6, and tightening of the clamp left to the use of a wrench or the like.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a brace, a structural member, and an exposed shank coupled to said structural member and extending substantially perpendicular thereto, a threaded end portion on said shank, said shank having an outer dimension approximating the outer diameter of said threaded end portion, an end portion on said brace having a slot, said slot having a width approximating the outer diameter of said shank but large enough to permit said shank to be disposed in said slot when said brace and said structural member are in connected relation, a reciprocable nut assembly threadedly connected to the threaded end of said shank, means on said shank for limiting the movement of said nut assembly away from said structural member and retaining said nut assembly in captive relationship upon said shank, said means including an enlarged head on the end of said exposed shank remote from said structural member, said head having a greater diameter than a threaded portion of said nut assembly, said nut assembly being of sufficient length to overlie the threads on said threaded end portion of said shank and prevent exposure thereof at all times during its limited reciprocal travel, said nut assembly including a nut having an axially extending portion having an end for abutment with said end portion of said brace, said axially extending portion overlying and enclosing the threads on the threaded end portion when said nut assembly threaded portion is abutting said shank head, and said nut assembly further including a hollow cup-shaped cap axially connected to said nut, said cap having axially disposed portions overlying and enclosing threads on the threaded end portion when said axially extending portion end is in abutment with said brace end portion and a fixed end wall, thereby defining a chamber within said cap between said wall and the threads on said nut.

2. Apparatus in accordance with claim 1 including a plate secured to said structural member and surrounding said shank, and an opening in said plate, said shank having an outer diameter substantially equal to the diameter of said opening.

3. Apparatus in accordance with claim 1 including a plate secured to said structural member and surrounding said shank, an opening in said plate, said shank having an outer diameter substantially equal to the diameter of said opening, and a grease fitting in said fixed end wall of said cap.

4. Apparatus in accordance with claim 1 wherein said nut assembly further includes a grease fitting in said fixed end wall of said cap.

5. Apparatus in accordance with claim 4, wherein said nut assembly further includes a handle secured to said cap.

References Cited by the Examiner

UNITED STATES PATENTS

| | | | |
|---|---|---|---|
| Re. 25,053 | 10/1961 | Jaculano | 287—53.5 |
| 1,641,801 | 9/1927 | Connely | 287—189.36 |
| 1,806,312 | 4/1931 | Schiller | 287—189.36 |
| 1,945,857 | 2/1934 | Harter | 85—35 |
| 2,686,086 | 8/1954 | French | 287—53.5 |
| 2,830,855 | 4/1958 | Hyre | 287—53.5 |

FOREIGN PATENTS

| | | |
|---|---|---|
| 535,475 | 2/1955 | Belgium. |
| 901,348 | 7/1962 | Great Britain. |
| 607,505 | 8/1960 | Italy. |

FRANK L. ABBOTT, *Primary Examiner.*

RICHARD W. COOKE, JR., *Examiner.*

R. S. VERMUT, *Assistant Examiner.*